(12) United States Patent
Beach et al.

(10) Patent No.: US 11,041,461 B2
(45) Date of Patent: Jun. 22, 2021

(54) EXHAUST LINER DEFLECTION LIMITER

(71) Applicant: United Technologies Corporation, Farmington, CT (US)

(72) Inventors: Eric Beach, Coventry, CT (US); Jorge I. Farah, Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 653 days.

(21) Appl. No.: 15/897,902

(22) Filed: Feb. 15, 2018

(65) Prior Publication Data
US 2019/0249571 A1 Aug. 15, 2019

(51) Int. Cl.
*F02K 1/82* (2006.01)
*F01D 25/28* (2006.01)

(52) U.S. Cl.
CPC .............. *F02K 1/822* (2013.01); *F01D 25/28* (2013.01); *F05D 2260/31* (2013.01); *Y10T 403/21* (2015.01)

(58) Field of Classification Search
CPC ........ F01D 25/246; F01D 25/26; F01D 25/28; F02K 1/80; F02K 1/82; F02K 1/822; F05D 2260/30; F05D 2260/31; F16B 5/0024; F16B 5/0088; F16B 5/0241; F16B 2001/0078; Y10T 403/21; Y10T 403/213; Y10T 403/217; Y10T 403/33; Y10T 403/335; Y10T 403/75
USPC ................... 403/28, 29, 30, 167, 168, 408.1
See application file for complete search history.

(56) References Cited

U.S. PATENT DOCUMENTS

| 3,199,294 | A | 8/1965 | Hagen | |
|---|---|---|---|---|
| 8,001,792 | B1 | 8/2011 | Dvorak et al. | |
| 9,617,872 | B2 | 4/2017 | Barry | |
| 9,683,743 | B2 | 6/2017 | Clemen | |
| 9,732,701 | B2 * | 8/2017 | Lu | F02K 1/80 |
| 9,784,301 | B2 * | 10/2017 | Gambardella | F01D 25/246 |
| 9,790,814 | B2 * | 10/2017 | Henry | F01D 25/246 |
| 10,422,238 | B2 * | 9/2019 | Lacombe | F01D 25/28 |
| 10,746,037 | B2 * | 8/2020 | Sippel | F01D 25/246 |

(Continued)

FOREIGN PATENT DOCUMENTS

| EP | 1918563 A2 * | 5/2008 | F02K 1/80 |
|---|---|---|---|
| FR | 2800809 A1 * | 5/2001 | F16B 5/0241 |
| WO | 2014164189 A1 | 10/2014 | |

OTHER PUBLICATIONS

Extended European Search Report dated Jun. 21, 2019, received for corresponding European Application No. 18212796.9.

*Primary Examiner* — Josh Skroupa
(74) *Attorney, Agent, or Firm* — Kinney & Lange, P.A.

(57) ABSTRACT

A system for limiting deflection of an exhaust sidewall liner on a variable geometry exhaust duct uses a spacer and a T-bolt. The system connects the exhaust sidewall liner to the static structure on a variable geometry exhaust duct. The spacer includes a chimney having a first side and a second side opposite of the first side, an aperture extending from the first side to the second side, a flange disposed on the first side, and at least one anti-rotation tab disposed on the second side near an edge of the second side. The T-bolt includes an elongated shaft that extends along an axis and having a diameter, and a head having at least one straight edge connected to an end of the shaft. The at least one straight edge engages with the anti-ration tab, thereby preventing rotation of the stud T-bolt about the axis.

18 Claims, 7 Drawing Sheets

(56) References Cited

U.S. PATENT DOCUMENTS 10,767,863 B2 * 9/2020 Freeman ............... F01D 25/246
2016/0161121 A1 6/2016 Chang

* cited by examiner

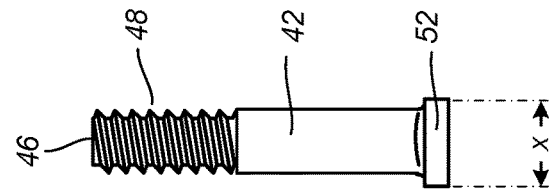
FIG. 3C
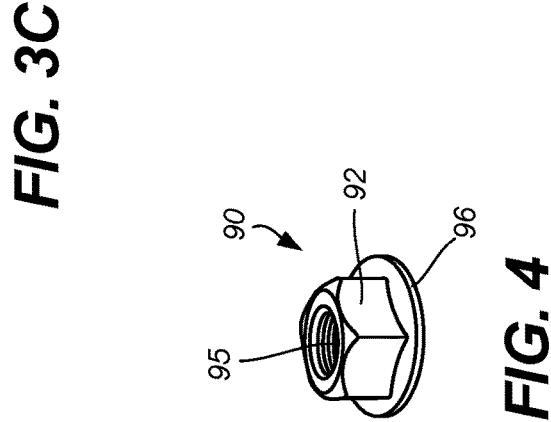
FIG. 4
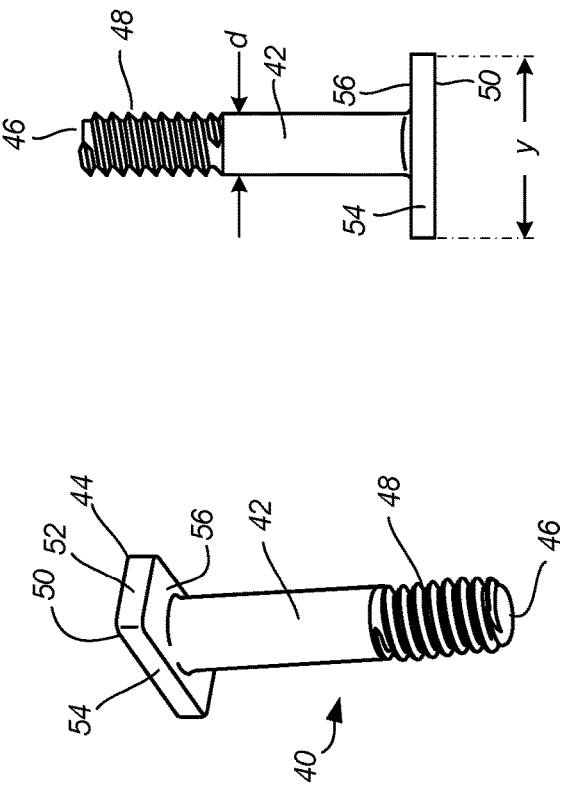
FIG. 3B
FIG. 3D
FIG. 3A

EXHAUST LINER DEFLECTION LIMITER

STATEMENT OF GOVERNMENT INTEREST

This invention was made with government support under Contract No.: F33657-99-D-2051 awarded by the Department of the Air Force. The government has certain rights in the invention.

BACKGROUND

A gas turbine engine typically includes a compressor section, a combustor section, a turbine section, and in some configurations, a variable-geometry exhaust duct. Variable geometry exhaust ducts frequently employ an arrangement of overlapping flap and seal members to define the periphery of the exhaust duct. Around the periphery of the exhaust duct is an exhaust sidewall liner assembly that includes an inner liner exposed to hot exhaust gases, and the exhaust sidewall liner is typically spaced from an outer structure with a plurality of hanger assemblies. The inner liner typically has a surface coating that resists hot exhaust gas erosion. In conventional configurations, the hanger assemblies cannot attach near the aft-most edges of the exhaust sidewall liners, allowing the exhaust sidewall liners to bow inward from thermal expansion during or following engine operation. When exhaust sidewall liners bow into the exhaust gas path, the exhaust duct geometry is altered and mechanical interference with adjacent structures may also occur. In extreme conditions, mechanical damage may occur.

Accordingly, it is desirable to design a system that captures the exhaust sidewall liners near the aft-most edges, while not penetrating the portion of the inner liner that is exposed to the hot exhaust gas which would have other undesirable effects.

SUMMARY

According to one embodiment of the present disclosure, a system for limiting deflection using a spacer and a bolt having a T-shape. The spacer includes a chimney having a first side and a second side opposite of the first side, an aperture extending from the first side to the second side, a flange disposed on the first side, and at least one anti-rotation tab disposed on the second side near an edge of the second side. The bolt includes an elongated shaft that extends along an axis and having a diameter, and a head having at least one straight edge connected to an end of the shaft. The at least one straight edge engages with the anti-ration tab, thereby preventing rotation of the T-bolt about the axis.

According to another embodiment of the present disclosure, a method for connecting a deflection limiter system to an exhaust sidewall liner. A T-bolt having a head connected to the end of an elongated shaft, at least one straight edge, and a shape corresponding to the first aperture and the second aperture is inserted through a first aperture and a rectangular aperture. The first aperture is in a static structure section and the second aperture is on a concealed side of a hollow exhaust liner proximate to the first aperture. The T-bolt is rotated approximately a quarter-turn. A spacer includes a chimney having a first side and a second side opposite of the first side, an aperture extending from the first side to the second side, a flange disposed on the first side, and at least one anti-rotation tab disposed on the second side near an edge of the second side. A spacer is placed over the elongated shaft and into the first aperture and the second aperture such that the straight edge engages with the anti-rotation tab, thereby preventing rotation of the T-bolt.

According to another embodiment of the present disclosure, a system for limiting deflection of an exhaust sidewall liner on a variable geometry exhaust duct using a spacer and a stud. An exhaust liner deflection limiter connects the exhaust sidewall liner to the static structure on a variable geometry exhaust duct. The spacer includes a chimney having a first side and a second side opposite of the first side, an aperture extending from the first side to the second side, a flange disposed on the first side, and at least one anti-rotation tab disposed on the second side near an edge of the second side. The stud includes an elongated shaft along an axis and a diameter, and extends through the spacer. The stud also has a head having at least one straight edge connected to an end of the shaft. The at least one straight edge engages with the anti-ration tab, thereby preventing rotation of the stud about the axis.

BRIEF DESCRIPTION OF THE DRAWINGS

FIG. 3A is a perspective view of the exhaust liner deflection limiter system T-bolt.

FIG. 3B is a side view of the T-bolt shown in FIG. 3A.

FIG. 3C is a front view of the T-bolt shown in FIG. 3A.

FIG. 3D is a bottom view of the T-bolt shown in FIG. 3A.

FIG. 4 is a perspective view of the exhaust liner deflection limiter threaded nut.

DETAILED DESCRIPTION

Figure 1A:
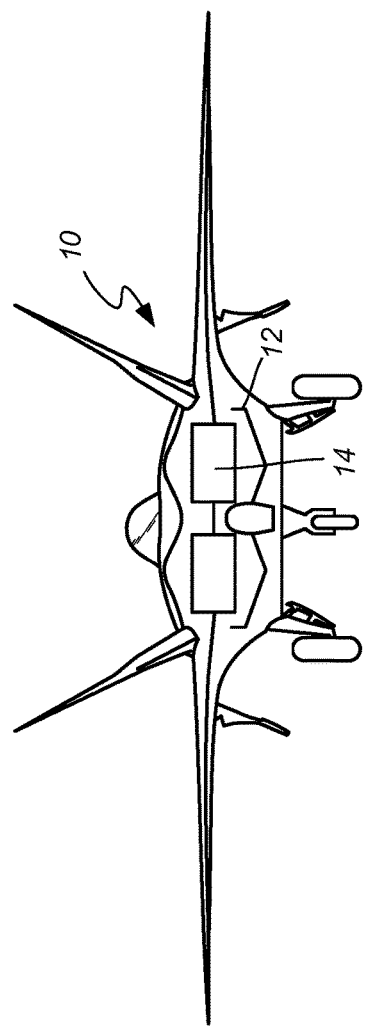
FIG. 1A is an aft view of an aircraft showing at least one variable-geometry exhaust duct.

FIG. 1A is an aft view of aircraft 10 showing at least one variable-geometry exhaust duct. Shown in FIG. 1A are aircraft 10, gas turbine engines 12, and variable-geometry ducts 14. In the illustrated embodiment, aircraft 10 is a high-performance aircraft having two gas turbine engines 12, each with a variable-geometry duct 14 from which exhaust gas is discharged from gas turbine engine 12. In general, variable-geometry duct 14 has moving pieces that vary the geometry of the exhaust gas discharge path from gas turbine engines 12, thereby assisting in achieving the performance requirements of aircraft 10.

Figure 1C:
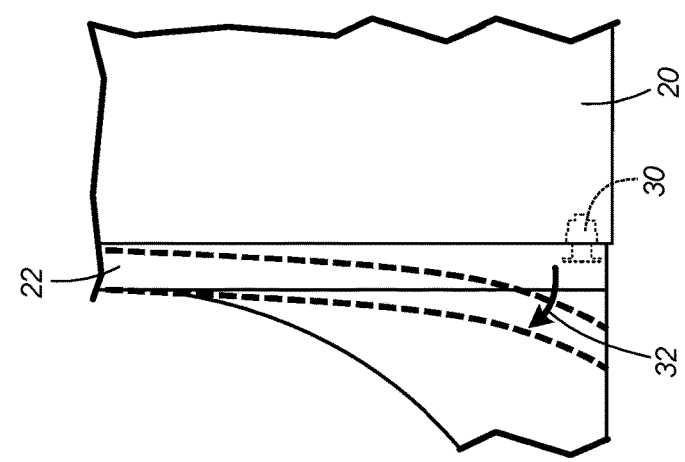
FIG. 1C is an enlarged view of a section of the variable-geometry exhaust duct shown in FIG. 1B.
Figure 1B:
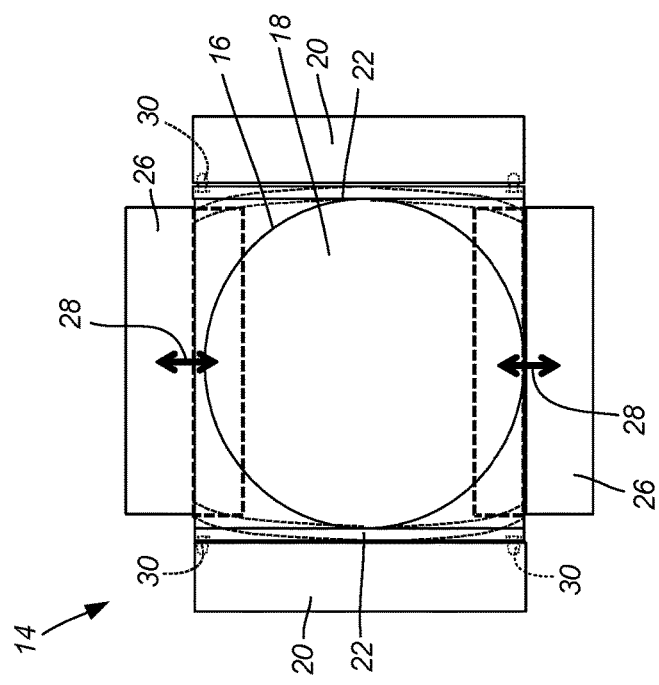
FIG. 1B is an aft view of a variable-geometry exhaust duct.

FIG. 1B is an aft view of variable-geometry duct 14 shown in FIG. 1A. Shown in FIG. 1B are variable geometry duct 14, throat 16, duct interior 18, static structure 20, exhaust liners 22, divergent/convergent flaps 26, actuation paths 28, exhaust liner deflection limiters 30, and exhaust liner bow arc 32. As used in this disclosure, "exhaust sidewall liner" and "exhaust liner" are used interchangeably. Exhaust liner deflection limiters 30 are shown in phantom, as they are concealed in the view shown in FIG. 1B.

During operation of gas turbine engine 12 exhaust gas is directed through duct interior 18 of variable-geometry duct 14. Each static structure 20 supports an exhaust liner 22, with exhaust liners 22 helping form the flow path for hot exhaust gas from gas turbine engine 12 (shown in FIG. 1A). Exhaust liners 22 are configured to withstand the temperature and velocity of hot exhaust gas from gas turbine engine 12. In the illustrated embodiment, divergent/convergent flaps 26 are movable along actuation path 28. The movements of divergent/convergent flaps 26 along actuation path 28 help provide the variable exhaust flow path of variable-geometry ducts 14. Dimensional tolerances between static structures 20, exhaust liners 22, and divergent/convergent flaps 26 are relatively tight to minimize the leakage of exhaust gas along paths other than the intended thrust vector.

Exhaust liners 22 are attached to static structures 20 by a system of support hangers (not shown). Because of the design of exhaust liners 22, there is not support hangers positioned near the extreme edges of exhaust liners 22. Under some conditions, thermal gradients along exhaust liner 22 would urge exhaust liner 22 to bow inward toward duct interior 18 as shown in phantom in FIG. 1B. To counteract this tendency, exhaust liner deflection limiters 30 constrain exhaust liners 22 against static structures 20, respectively. If exhaust liner deflection limiters were not installed on variable geometry duct 14, exhaust liners could bow inward along exhaust liner bow arc 32. The inward bowing of exhaust liners 22 along exhaust liner bow arc 32 can have undesirable effects including altering the exhaust gas path geometry and mechanically interfering with divergent/convergent flaps 26. In some cases of mechanical interference the mechanical interference between exhaust liners 22 and divergent/convergent flaps 26 can prevent the movement of divergent/convergent flaps 26, thereby preventing variable-geometry duct 14 from attaining the program geometry. Moreover, in some cases, the mechanical interference between exhaust liners 22 and divergent/convergent flaps 26 can cause mechanical damage.

FIG. 1C is an enlarged view of a section of the variable-geometry exhaust duct shown in FIG. 1B. Shown in FIG. 1C are static structure 20, exhaust liners 22, exhaust liner deflection limiter 30, and exhaust liner bow arc 32. As described in FIG. 1B, exhaust liner deflection limiter 30 is shown in phantom. Exhaust liner deflection limiter 30 constrains the undesired inward bowing of exhaust liner 22.

Figure 2C:
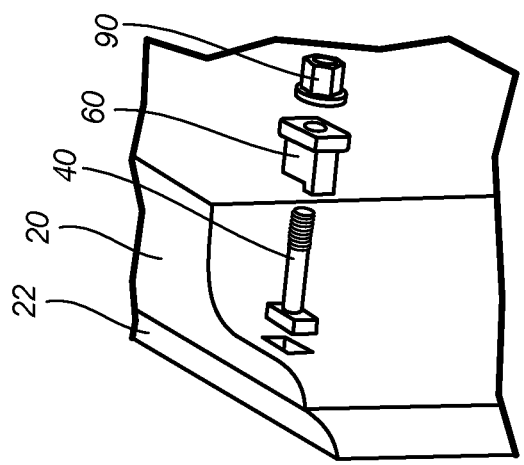
FIG. 2C is an exploded perspective view showing the exhaust liner deflection limiter system.
Figure 2B:
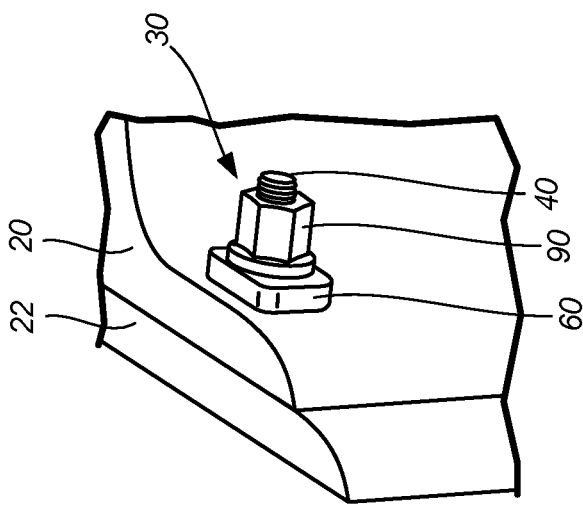
FIG. 2B is an enlarged perspective view of the exhaust duct flap of FIG. 2A.
Figure 2A:
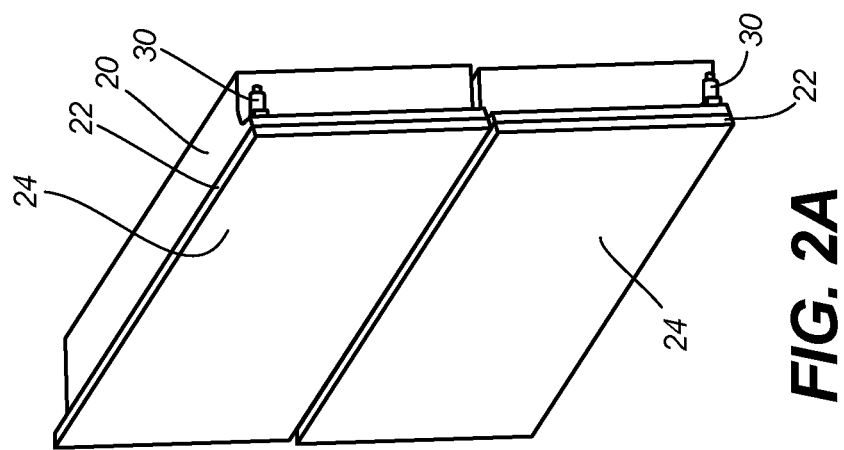
FIG. 2A is a perspective end view of a section of an exhaust duct flap showing two of the exhaust liner deflection limiter systems.

FIG. 2A is a perspective end view of a section of an exhaust duct flap. Shown in FIG. 2A are static structure 20, exhaust liner 22, coating 24, and exhaust liner deflection limiters 30. As described in FIG. 1B, static structure 20 supports exhaust liner 22, helping form the flow path for hot exhaust gas from gas turbine engine 12 while also withstanding the temperature and velocity of hot exhaust gas from gas turbine engine 12. Exhaust liner 22 is coated with coating 24 on the surface that is exposed to the flow of exhaust gas, with coating 24 having mechanical and chemical properties that help protect exhaust liner 22 from high temperature and high velocity exhaust gas.

As will be described in FIG. 6B, exhaust liner 22 contains an internal passageway for forced air flow to help cool exhaust liner 22 during operation of gas turbine engine 12. Exhaust liner deflection limiters 30 are installed on static structure 20, capturing exhaust liner 22 from the inside of the internal passageway to hold exhaust liner 22 in position against static structure 20, thereby preventing or limiting the bowing of exhaust liner 22. It is advantageous to constrain the bowing of exhaust liner 22 from the inside to avoid penetrating or disrupting coating 24 on exhaust liner 22.

FIG. 2B is an enlarged perspective view of a corner of the exhaust duct flap of FIG. 2A. Shown in FIG. 2B are static structure 20, exhaust liner 22, exhaust liner deflection limiter 30, T-bolt 40, spacer 60, and nut 90. The primary components that comprise exhaust liner deflection limiter 22 are T-bolt 40, spacer 60, and nut 90, which will be described in detail in the figures that follow.

FIG. 2C is an exploded perspective view showing the exhaust liner deflection limiter 30 of FIG. 2B. Shown in FIG. 2C are static structure 20, exhaust liner 22, static structure aperture 36, T-bolt 40, spacer 60, and nut 90. T-bolt 40 and nut 90 have mating threads. When assembling exhaust liner deflection limiter 30, T-bolt 40 is inserted through static structure 20, into exhaust liner 22, turned 90 degrees, and spacer 60 is slid over T-bolt 40 so that spacer 60 is in contact with static structure 20. Then nut 90 is threaded upon T-bolt 40 and snugged down in contact with spacer 60, thereby holding exhaust liner deflection limiter 30 in position. In an embodiment, nut 90 can be a lock nut, thereby securing exhaust liner deflection limiter 30 in position under normal operating conditions. T-bolt 40, spacer 60, and nut 90 will be described in greater detail in the figures that follow.

FIG. 3A is a perspective front-side view of the exhaust liner deflection limiter system T-bolt 40. Shown in FIG. 3A are T-bolt 40, shank 42, head 44, tip 46, threads 48, top 50, front 52, side 54, and head underside 56. FIG. 3B is a side view of T-bolt 40 shown in FIG. 3A. FIG. 3C is a front view of T-bolt 40 shown in FIG. 3A. Shown in FIGS. 3B and 3C are shank 42, head 44, tip 46, threads 48, top 50, side 54, and head underside 56. Shank 42 has diameter d. Side 54 has length y. Front 52 has width x. FIG. 3D is a bottom view of T-bolt 40 shown in FIG. 3A. Shown in FIG. 3D is tip 46, threads 48, front 52, side 54, and head underside 56, as described in FIG. 3A. FIGS. 3A-3D will now be discussed simultaneously, and the directional terminology, such as "front" and "side", used in the description thereof is employed for exemplary purposes related to the illustrated embodiment.

T-bolt 40 is a stud that is captured by nut 90, in that T-bolt 40 and nut 90 have corresponding threads. T-bolt 40 can be characterized as a specialized threaded fastener, with shank 42 and head 44 forming a shape resembling the letter "T". In the illustrated embodiment, shank 42 is round. Tip 46 is at the opposite end of shank 42 from head 44, and threads 48 are in the region of shank 42 near tip 46. Shank 42 may also be described as an elongated shaft. T-bolt 40 can be further described as having front 52 and side 54 wherein front 52 has width x, and side 54 has length y. In the illustrated embodiment, length y of side 54 is greater than width x of front 52. As will be described in FIGS. 6A-6C, length y and width x of T-bolt being different contribute to the ability of exhaust liner deflection limiter 30 to function as described in the present disclosure.

In addition, head 44 can be further described as having top 50 and head underside 56, as illustrated. Threads 48 are on shank 42, beginning at tip 46 and extending along shank 42 toward head 44 so that nut 90 can be threaded onto T-bolt 40. Accordingly, threads 48 extend along shank 42 to apposition that will enable thread engagement with nut 90 in the completed assembly of exhaust liner deflection limiter 30.

In the illustrated embodiment, T-bolt 40 is manufactured from metal. In some embodiments, T-bolt 40 may be manufactured from a nickel-based alloy. In other embodiments, T-bolt 40 may be manufactured from a super-alloy. In one particular embodiment, T-bolt 40 may be manufactured from Inconel® alloy 718.

In other embodiments, T-bolt 40 can be replaced by a stud that performs the equivalent function of T-bolt 40, while remaining within the scope of the present disclosure.

FIG. 4 is a perspective side view of exhaust liner deflection limiter nut 90. Shown in FIG. 4 are nut 90, sides 92, threads 94, and base 96. In the illustrated embodiment, nut 90 has six sides 92 and can be engaged with a tool, such as a hexagonal wrench. Threads 94 are internal to nut 90 and have dimensions that correspond with the external threads 48 on T-bolt 40, allowing nut 90 to engage with T-bolt 40 to form exhaust liner deflection limiter 30.

In the illustrated embodiment, nut 90 is inserted on T-bolt 40 with base 96 directed toward shank 42 of T-bolt 40. In some embodiments, nut 90 can be a locknut. Those who are skilled in the threaded fastener arts are familiar with the use of locknuts and the various mechanisms that may be utilized for a locknut to lock in place when installed. In the illustrated embodiment, nut 90 is manufactured from metal. In some embodiments, nut 90 may be manufactured from a nickel-based alloy. In other embodiments, nut 90 may be manufactured from a super-alloy. In one particular embodiment, nut 90 may be manufactured from Alloy A-286.

In yet other embodiments, nut 90 may be replaced with a mechanical fastener that performs the equivalent function of nut 90 when used with T-bolt 40. For example, in another embodiment, a rivet and backing plate could be used in place of T-bolt 40 and nut 90, where the rivet shank is equivalent in diameter to shank 42 and the backing plate is equivalent in size to base 96.

Figure 5A:
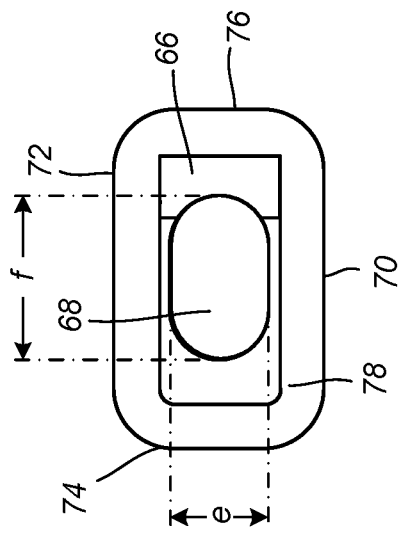
FIG. 5A is a perspective view of the exhaust liner deflection limiter system spacer.
Figure 5B:
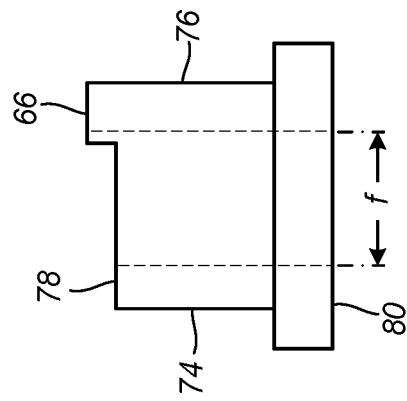
FIG. 5B is a front view of the spacer shown in FIG. 5A.
Figure 5C:
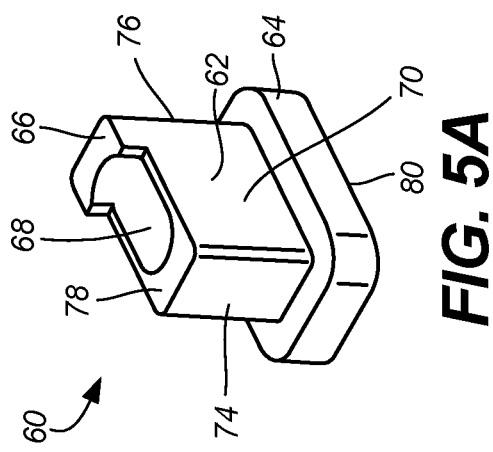
FIG. 5C is a left side view of the spacer shown in FIG. 5A.
Figure 5D:
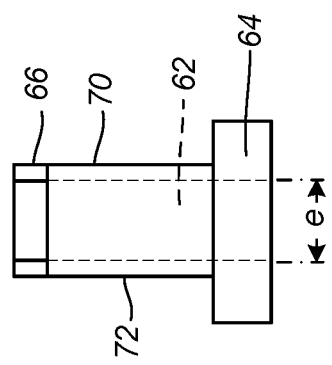
FIG. 5D is a top view of the spacer shown in FIG. 5A.

Referring next to FIGS. 5A-5D. FIG. 5A is a perspective front-left-side view of the exhaust liner deflection limiter system spacer 60. FIG. 5B is a front view of the spacer shown in FIG. 5A, FIG. 5C is a left side view of the spacer shown in FIG. 5A, and FIG. 5D is a top view of the spacer shown in FIG. 5A. Shown in FIGS. 5A-5D are spacer 60, chimney 62, flange 64, anti-rotation tab 66, aperture 68, front 70, back 72, left side 74, right side 76, top 78, and bottom 80. FIGS. 5A-5D will now be discussed simultaneously, and the directional terminology, such as "front" and "side", used in the description thereof is employed for exemplary purposes related to the illustrated embodiment.

In the illustrated embodiment, anti-rotation tab 66 is located on top 78 and near right side 76 of spacer 60. As shown in FIG. 5D, anti-rotation tab 66 protrudes upward from top 78 of spacer 60. In the illustrated embodiment, spacer 60 is symmetrical on left side 74 and right side 76, with the exception of anti-rotation tab 66. Accordingly, anti-rotation tab can be located on top 78 near left side 74 of spacer 60, while having the same description as above. In the illustrated embodiment, one anti-rotation tab 66 is located on top 78 of spacer 60, at one side or the other. In another embodiment two anti-rotation tabs 66 can be located on top 78 of spacer 60, with one anti-rotation tab 66 near each of left side 74 and right side 76.

In the illustrated embodiment, aperture 68 is oblong in cross-sectional shape having minor dimension e and major dimension f. The axis of measure for major dimension f is generally parallel to front 70 and back 72. In the illustrated embodiment, minor dimension e is approximately equivalent to diameter d of T-bolt 40. In other embodiments, minor dimension e can exceed diameter d of T-bolt 40 by an amount that allows shank 42 to be inserted through aperture 68 without allowing head 50 or nut 90 to enter aperture 68. In contrast, major dimension f is substantially larger than diameter d of T-bolt 40 in order for aperture 68 to accommodate shank 42 and allow lateral movement of T-bolt 40 along the major axis of aperture 68 along the direction indicated by dimension f in FIG. 5D, thereby accommodating a thermal growth differential between exhaust liner 22 and static structure 20.

In the illustrated embodiment, spacer 60 is manufactured from metal. In some embodiments, spacer 60 may be manufactured from a nickel-based alloy. In other embodiments, spacer 60 may be manufactured from a super-alloy. In one particular embodiment, spacer 60 may be manufactured from Inconel® alloy 718.

Figure 6C:
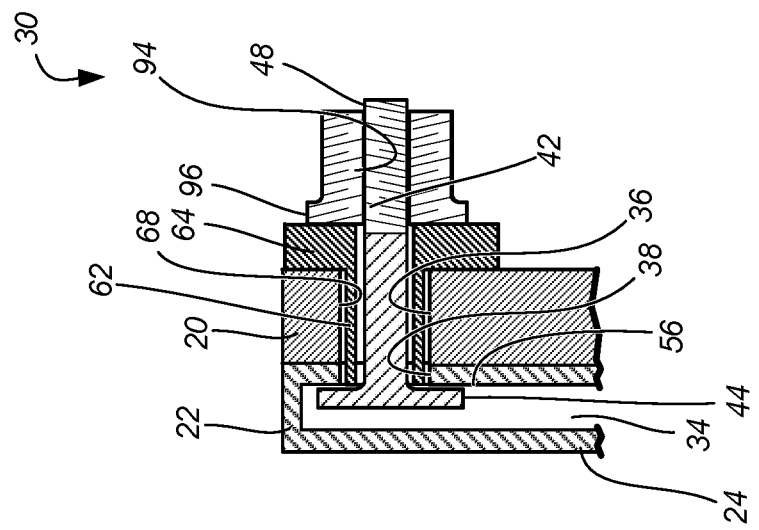
FIG. 6C is a cross-sectional view of the exhaust liner deflection limiter taken along line 6-6 in FIG. 6A.
Figure 6B:
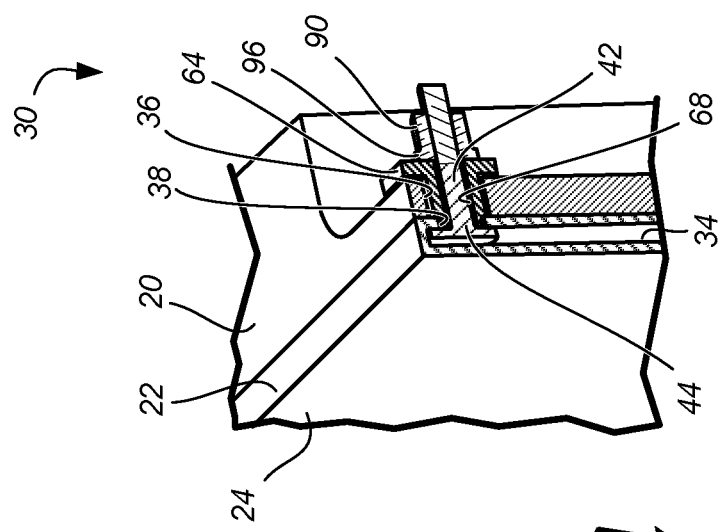
FIG. 6B is a cross-sectional perspective view of the exhaust liner deflection limiter taken along line 6-6 in FIG. 6A.
Figure 6A:
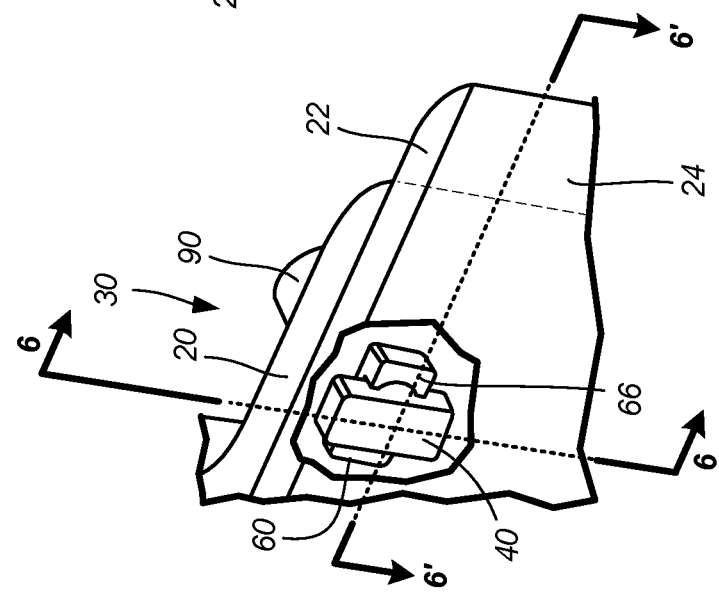
FIG. 6A is a cut-away perspective view showing the T-bolt and spacer of the exhaust liner deflection limiter system.
Figure 6E:
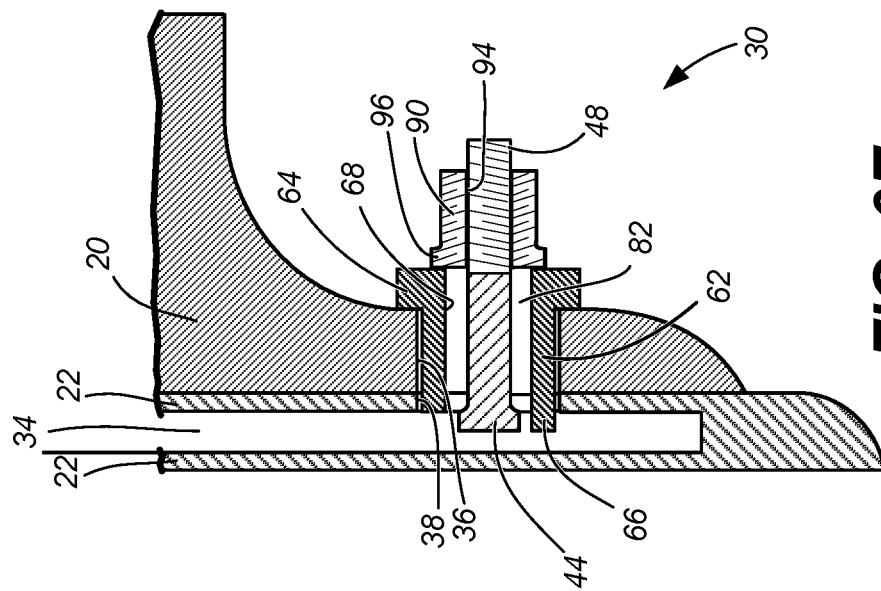
FIG. 6E is a cross-sectional view taken of the exhaust liner deflection limiter taken along line 6'-6' in FIG. 6A.
Figure 6D:
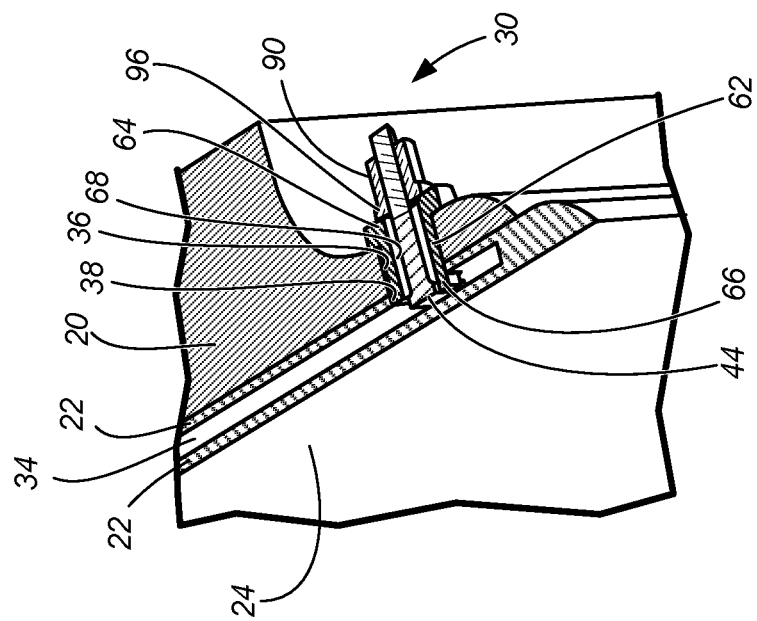
FIG. 6D is a cross-sectional perspective view of the exhaust liner deflection limiter taken along line 6'-6' in FIG. 6A.

FIG. 6A is a cut-away perspective view showing the top of T-bolt 40 and spacer 60 of the exhaust liner deflection limiter 30. Shown in FIG. 6A are static structure 20, exhaust liner 22, coating 24, exhaust liner deflection limiter 30, T-bolt 40, spacer 60, anti-rotation tab 66, and nut 90. FIG. 6A illustrates the position of exhaust liner deflection limiter 30 when installed on a static structure 20, as described in FIGS. 2A-2C. FIG. 6B is vertical cross-sectional perspective view of the exhaust liner deflection limiter 30. FIG. 6C is a vertical cross-section taken through the center of the exhaust liner deflection limiter 30. FIG. 6D is a horizontal cross-sectional perspective view of the exhaust liner deflection limiter 30. FIG. 6E is a horizontal cross-section taken through the center of the exhaust liner deflection limiter 30. Shown in FIGS. 6B-6E are static structure 20, exhaust liner 22, coating 24, exhaust liner deflection limiter 30, air cooling passageway 34, static structure aperture 36, exhaust liner aperture 38, shank 42, head 44, threads 48, head underside 56, chimney 62, flange 64, anti-rotation tab 66, aperture 68, aperture gap 82, nut 90, threads 94, and base 96. FIGS. 6A-6E will now be discussed simultaneously, and the directional terminology used in the description thereof is employed for exemplary purposes related to the illustrated embodiment.

As shown in FIG. 6B, exhaust liner 22 can be described as being hollow because of the existence of air cooling passageway 34. Exhaust liner deflection limiter 30 is used as a blind fastening system to constrain the bowing of exhaust liner 22 to avoid penetrating or disrupting coating 24 on exhaust liner 22, which could have adverse effects. Exhaust liner aperture 38 can be described as being in the concealed side of exhaust liner 22, because during normal operation of gas turbine engine 12, the concealed side of exhaust liner 22 is in contact with, or at least situated nearby to, static structure 20. Therefore, exhaust liner aperture 38 is said to be concealed from access and/or from plain view.

Static structure aperture 36 and exhaust liner aperture 38 are substantially aligned with each other, having a cross-sectional shape that will accommodate head 44 of T-bolt 40 to be inserted from the side of static structure 20. Head 44 is inserted far enough to allow head underside 56 to enter air cooling passageway 34, after which T-bolt 40 is rotated about the axis of shank 42 approximately one quarter-turn. Next, spacer 60 is inserted over threads 48 and shank 42 of T-bolt 40, with shank 42 passing through aperture 68 of spacer 60. The cross-sectional shape of chimney 62 has an outer shape that will pass through static structure aperture 36 and exhaust liner aperture 38 with relatively tight mechanical tolerances, for example, a transition fit. Accordingly, in the illustrated embodiment, the cross-sectional shape and size of head 44 are substantially similar to the cross-sectional shape and size of chimney 62.

Spacer 60 can be positioned in one of two ways in exhaust liner deflection limiter 30. In the illustrated embodiment, the orientation of anti-rotation tab 66 is to the right of head 44, although it could be to the left of head 44. When spacer 60 is fully inserted into static structure aperture 36, flange 64 is in contact with static structure 20 and anti-rotation tab 66 is in contact with side 54 of T-bolt 40. Thereby, T-bolt 40 is prevented from rotating by anti-rotation tab 66.

Next, assembly of exhaust liner deflection limiter 30 is completed by threading nut 90 onto T-bolt 40, achieving thread engagement between threads 48 on T-bolt 40 and threads 94 in nut 90. Nut 90 is tightened upon T-bolt 40 until base 96 contacts and is appropriately snugged against flange 64.

During operation of gas turbine engine 12 cooling air is forcibly circulated through air cooling passageway 34 to provide cooling to exhaust liner 22. Accordingly, it is undesirable to have excessive air leakage from or around exhaust liner deflection limiter 30 as this could otherwise interfere with the cooling of exhaust liner 22. As illustrated in FIGS. 6B-6E, the seating of base 96 to flange 64, and the seating of flange 64 to static structure 20 minimizes air leakage through or around exhaust liner deflection limiter 30. It can be beneficial to accommodate the lateral shift of exhaust liner 22 relative to static structure 20, as there may be differences in temperatures and/or the linear coefficients of thermal expansion of the materials used in exhaust liner 22 and static structure 20. Aperture gap 82 is created by the mismatch between major dimension f and diameter d of T-bolt 40, as shown in FIG. 5D. Aperture gap 82 is most clearly visible in FIG. 6E, which allows for the up/down movement of exhaust liner 22 relative to static structure 20. Aperture gap 82 allows for the aforementioned lateral shift to occur, while retaining the sealing properties of exhaust liner deflection limiter 30. For example, base 96 on nut 90 covers aperture 68 on spacer 60, thereby restricting the leakage of air through aperture gap 82.

The desired amount of lateral shift being accommodated between exhaust liner 22 and static structure 20 can vary according to the particular environment in which exhaust liner deflection limiter 30 is deployed, although this value can be generally expressed by comparing major dimension f with minor dimension e of aperture 68. In the illustrated embodiment, this difference is approximately equivalent to the width of minor dimension e, as depicted by major dimension f being approximately equal to twice minor dimension e. As noted in FIGS. 5A-5D, minor dimension e is approximately equal to, or just larger than, diameter d of T-bolt 40. In other embodiments, the mismatch between major dimension f and minor dimension e of aperture 68 can be different, allowing for a maximum lateral shift that is either less than or greater than that of the illustrated embodiment. In some embodiments it may not be desirable to accommodate a lateral shift between exhaust liner 22 and static structure 20.

Figure 7:
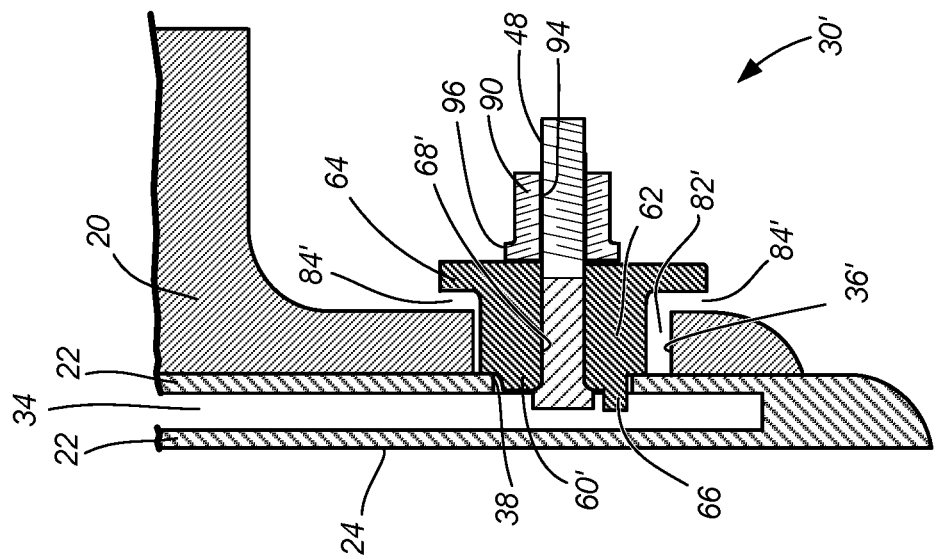
FIG. 7 is a cross-sectional view of an alternative embodiment of the exhaust liner deflection limiter that is taken along line analogous to 6'-6' in FIG. 6A.

FIG. 7 is a horizontal cross-section of an alternative embodiment of the exhaust liner deflection limiter 30'. Shown in FIG. 7 are static structure 20, exhaust liner 22, coating 24, exhaust liner deflection limiter 30', air cooling passageway 34, static structure aperture 36', exhaust liner aperture 38, threads 48, flange 64, anti-rotation tab 66, aperture 68', aperture gap 82', nut 90, threads 94, and flange 96. The components and assembly of exhaust liner deflection limiter 30' is similar to that described above, with some differences. For example, a lateral shift of exhaust liner 22 relative to static structure 20 is accommodated by the movement of spacer 60' within static structure aperture 36'. Accordingly, static structure aperture 36' is extended in the up/down direction as shown in FIG. 7, with the dimension of static structure aperture 36' exceeding the dimension of chimney 62 by an amount that is equivalent to the degree of lateral shift that can be accommodated between exhaust liner 22 and static structure 20. This configuration creates aperture gap 82' between chimney 62 and static structure 20, as illustrated. In the illustrated embodiment, flange gap 84' exists between flange 64 and static structure 20 when exhaust liner 22 is in contact with static structure 20. Flange gap 84' is a controlled gap and can be set by the dimensions of spacer 60' relative to static structure 20. Accordingly, flange gap 84' can be set to meet any desired deflection limit, acting to restrict bow arc 32 as shown in FIGS. 1B and 1C to a set value. In some embodiments, flange gap 84' can be used to accommodate dimensional tolerance stack-up between static structure 20 and exhaust liner 22. In the illustrated embodiment, the leakage of cooling air from air cooling passageway 34 through or around exhaust liner deflection limiter 30' is restricted by the contact between spacer 60' and exhaust liner 22. Also, in the illustrated embodiment, aperture 68' can be round in cross-sectional shape, with a diameter that accommodates diameter d of shank 42, as shown in FIG. 3B.

Throughout this disclosure, the term lateral shift has been used to describe movement of exhaust liner 22 relative to static structure 20 in the plane that is generally perpendicular to the axis of T-bolt 40. This lateral shift has been illustrated as being up and down direction in FIGS. 6E and 7, but it can also be into and out of the drawing as shown in FIGS. 6E and 7, or in any other direction along the aforementioned plane.

The embodiments described above are exemplary, and various alternative embodiments are within the scope of the present disclosure. For example, in one embodiment it may not be desirable to accommodate a significant lateral shift of exhaust liner 22 relative to static structure 20, and aperture gap 82 or 82' may be reduced to a negligible value. In a different embodiment, the lateral shift of exhaust liner 22 relative to static structure 20 can be accommodated by using both of the features illustrated in FIGS. 6B-6E and 7. In such an embodiment, aperture gap 82 within aperture 68 of spacer 60 and aperture gap 68' within static structure aperture 36' can work together to accommodate a lateral shift of exhaust liner 22 relative to static structure 20. In another embodiment, aperture gap 82 within aperture 68 of spacer 60 and aperture gap 68' within static structure aperture 36' can work together to accommodate a lateral shift in any direction of exhaust liner 22 relative to static structure 20, as defined above. In yet another embodiment, minimizing the leakage of cooling air from air cooling passageway 34 through or around exhaust liner deflection limiter 30 or 30' may not be necessary or desirable. Therefore, in some embodiments, the design of spacer 60 and/or nut 90 can be modified to allow for greater leakage of cooling air through or around exhaust liner deflection limiter 30 or 30'.

Discussion of Possible Embodiments

The following are non-exclusive descriptions of possible embodiments of the present invention.

A deflection limiter system: a spacer comprising: a chimney having a first side and a second side opposite of the first side and further including an aperture wherein the aperture extends from the first side to the second side; a flange, the flange being disposed on the first side; and at least one anti-rotation tab, the anti-rotation tab being disposed on the second side near an edge of the second side; and a bolt having a T-shape, the bolt comprising: an elongate shaft, the shaft extending along an axis and having a diameter; and a head connected to an end of the shaft, the head having at least one straight edge; wherein the at least one straight edge engages with the anti-ration tab, thereby preventing rotation of the T-bolt about the axis.

The deflection limiter system of the preceding paragraph can optionally include, additionally and/or alternatively, any one or more of the following features, configurations and/or additional components:

A further embodiment of the foregoing deflection limiter system wherein the bolt further includes external threads, the threads being circumferential on the elongate shaft at a distal end from the head.

A further embodiment of the foregoing deflection limiter system further including a nut, wherein the nut includes internal threads, the internal threads having dimensions that allow the nut to threadably matably engage with the external threads on the bolt.

A further embodiment of the foregoing deflection limiter system wherein the nut is a self-locking nut.

A further embodiment of the foregoing deflection limiter system wherein the aperture is oblong in cross-sectional shape, the oblong defining a major dimension and a minor dimension.

A further embodiment of the foregoing deflection limiter system wherein the major dimension is greater than the minor dimension.

A further embodiment of the foregoing deflection limiter system wherein the minor dimension is at least as large as the diameter, thereby allowing the bolt shaft to enter the aperture A further embodiment of the foregoing deflection limiter system wherein the bolt is manufactured from a nickel alloy.

A further embodiment of the foregoing deflection limiter system wherein the spacer is manufactured from a nickel alloy.

A further embodiment of the foregoing deflection limiter system wherein wherein the deflection limiter system is positioned in an exhaust duct of a gas turbine engine to attach an exhaust liner to a static structure.

A method for connecting a deflection limiter system to an exhaust sidewall liner, the method comprising inserting a T-bolt through a first aperture and a rectangular aperture, the T-bolt having a head with at least one straight edge and a shape corresponding to the first aperture and the second aperture, the head being connected to an end of an elongate shaft, and the first aperture being in a static structure section and the second aperture being on a concealed side of a hollow exhaust liner, proximate to the first aperture; rotating the T-bolt approximately a quarter-turn; placing a spacer onto the elongate shaft, the spacer comprising: a chimney with an aperture extending from a first end to a second end for receiving the elongate shaft; a flange disposed on the first end of the chimney; and an anti-rotation tab disposed on the second end of the chimney near an edge of the second end; and inserting a spacer into the first aperture and the second aperture such that the straight edge engages with the anti-rotation tab, thereby preventing rotation of the T-bolt.

A further embodiment of the foregoing method for connecting a deflection limiter system to an exhaust sidewall liner, further comprising attaching a nut to the T-bolt such that internal threads of the nut threadably matably engage with external threads of the T-bolt.

A further embodiment of the foregoing method for connecting a deflection limiter system to an exhaust sidewall liner, wherein the nut is a self-locking nut.

A further embodiment of the foregoing method for connecting a deflection limiter system to an exhaust sidewall liner, wherein the nut is manufactured from a nickel alloy.

A further embodiment of the foregoing method for connecting a deflection limiter system to an exhaust sidewall liner, wherein the T-bolt is manufactured from a nickel alloy.

A further embodiment of the foregoing method for connecting a deflection limiter system to an exhaust sidewall liner, wherein the spacer is manufactured from a nickel alloy.

A system for limiting deflection of an exhaust sidewall liner on a variable geometry exhaust duct, the system comprising: the exhaust sidewall liner; a static structure; and an exhaust liner deflection limiter connecting the exhaust sidewall liner to the static structure, the exhaust liner deflection limiter comprising: a spacer positioned in the static structure, the spacer comprising: a chimney having a first side and a second side opposite of the first side and further including an aperture wherein the aperture extends from the first side to the second side; a flange, the flange being disposed on the first side; and at least one anti-rotation tab, the anti-rotation tab being disposed on the second side near an edge of the second side; a stud having a head and a shaft, the head being positioned in the exhaust sidewall liner and the shaft extending through the spacer; and a fastener connected to the shaft to secure the exhaust sidewall liner to the static structure.

A further embodiment of the foregoing system for limiting deflection of an exhaust sidewall liner on a variable geometry exhaust duct, wherein the chimney aperture is oblong in cross-sectional shape, the oblong defining a major dimension and a minor dimension, wherein the major dimension is greater than the minor dimension by an amount that accommodates lateral shift between the static structure and the exhaust sidewall liner.

A further embodiment of the foregoing system for limiting deflection of an exhaust sidewall liner on a variable geometry exhaust duct, wherein the static structure aperture dimension is greater than the chimney dimension by an amount that accommodates lateral shift between the static structure and the exhaust sidewall liner.

A further embodiment of the foregoing system for limiting deflection of an exhaust sidewall liner on a variable geometry exhaust duct, wherein the spacer is manufactured from a nickel alloy.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A deflection limiter system comprising:
   a spacer comprising:
      a chimney having a first side and a second side opposite of the first side and further including an aperture wherein the aperture extends from the first side to the second side, and wherein the aperture is oblong in cross-sectional shape, the oblong cross-sectional shape defining a major dimension and a minor dimension;
      a flange, the flange being disposed on the first side; and
      at least one anti-rotation tab, the anti-rotation tab being disposed on the second side near an edge of the second side; and
   a bolt having a T-shape, the bolt comprising:
      an elongate shaft, the shaft extending along an axis and having a diameter; and
      a head connected to an end of the shaft, the head having at least one straight edge;
      wherein the at least one straight edge engages with the anti-rotation tab, thereby preventing rotation of the T-bolt about the axis;
      wherein the diameter of the bolt is smaller than the major dimension of the aperture such that a gap exists between the bolt and spacer when the spacer is inserted over the bolt.

2. The deflection limiter system of claim 1, wherein the bolt further includes external threads, the threads being circumferential on the elongate shaft at a distal end from the head.

3. The deflection limiter system of claim 2, further including a nut, wherein the nut includes internal threads, the internal threads having dimensions that allow the nut to threadably matably engage with the external threads on the bolt.

4. The deflection limiter system of claim 3, wherein the nut is a self-locking nut.

5. The deflection limiter system of claim 1, wherein the major dimension is greater than the minor dimension.

6. The deflection limiter system of claim 1, wherein the bolt is manufactured from a nickel alloy.

7. The deflection limiter system of claim 1, wherein the spacer is manufactured from a nickel alloy.

8. The deflection limiter system of claim 1, wherein the deflection limiter system is positioned in an exhaust duct of a gas turbine engine to attach an exhaust liner to a static structure.

9. A method for connecting a deflection limiter system to an exhaust sidewall liner, the method comprising:
   inserting a T-bolt through a first aperture and a rectangular, second aperture, the T-bolt having a head with at least one straight edge and a shape corresponding to the first aperture and the second aperture, the head being connected to an end of an elongate shaft, and the first aperture being in a static structure section and the second aperture being on a concealed side of a hollow exhaust liner, proximate to the first aperture;
   rotating the T-bolt approximately a quarter-turn;
   placing a spacer onto the elongate shaft, the spacer comprising:
      a chimney with an aperture extending from a first end to a second end for receiving the elongate shaft;
      a flange disposed on the first end of the chimney; and
      an anti-rotation tab disposed on the second end of the chimney near an edge of the second end;
      wherein a diameter of the elongate shaft is less than a major dimension of the aperture of the spacer such that a gap exists between the bolt and spacer when the spacer is inserted over the bolt; and
   inserting the spacer into the first aperture and the second aperture such that the straight edge engages with the anti-rotation tab, thereby preventing rotation of the T-bolt.

10. The method of claim 9, further comprising attaching a nut to the T-bolt such that internal threads of the nut threadably matably engage with external threads of the T-bolt.

11. The method of claim 10, wherein the nut is a self-locking nut.

12. The method of claim 10, wherein the nut is manufactured from a nickel alloy.

13. The method of claim 9, wherein the T-bolt is manufactured from a nickel alloy.

14. The method of claim 9, wherein the spacer is manufactured from a nickel alloy.

15. A system for limiting deflection of an exhaust sidewall liner on a variable geometry exhaust duct, the system comprising:
   the exhaust sidewall liner;
   a static structure; and
   an exhaust liner deflection limiter connecting the exhaust sidewall liner to the static structure, the exhaust liner deflection limiter comprising:
      a spacer positioned in the static structure, the spacer comprising:
         a chimney having a first side and a second side opposite of the first side and further including an aperture wherein the aperture extends from the first side to the second side;
         a flange, the flange being disposed on the first side; and
         at least one anti-rotation tab, the anti-rotation tab being disposed on the second side near an edge of the second side;
      a stud having a head and a shaft, the head being positioned in the exhaust sidewall liner and the shaft extending through the spacer; and
      a fastener connected to the shaft to secure the exhaust sidewall liner to the static structure;
      wherein the chimney aperture is oblong in cross-sectional shape, the oblong defining a major dimension and a minor dimension; and
      wherein a diameter of the shaft is less than the major dimension of the chimney aperture such that a gap exists between the bolt and spacer when the spacer is inserted over the bolt.

16. The system of claim 15, wherein the major dimension is greater than the minor dimension by an amount that accommodates lateral shift between the static structure and the exhaust sidewall liner.

17. The system of claim 15, wherein the static structure aperture dimension is greater than the chimney dimension by an amount that accommodates lateral shift between the static structure and the exhaust sidewall liner.

18. The system of claim 15, wherein the spacer is manufactured from a nickel alloy.

* * * * *